Oct. 29, 1940. R. M. FERGUSON 2,220,014
SYNCHRONIZED CONTROL FOR MACHINE GUNS
Filed April 5, 1939
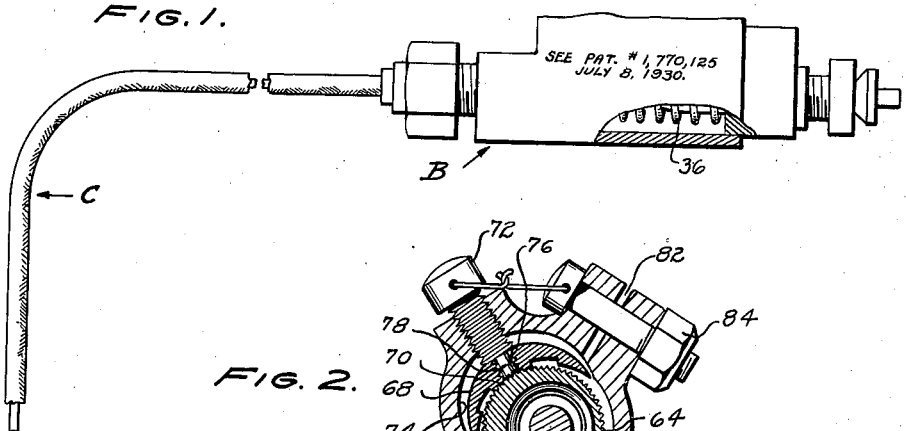
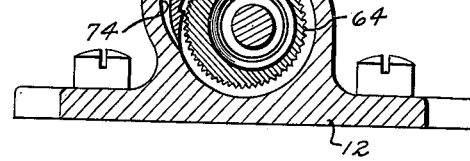
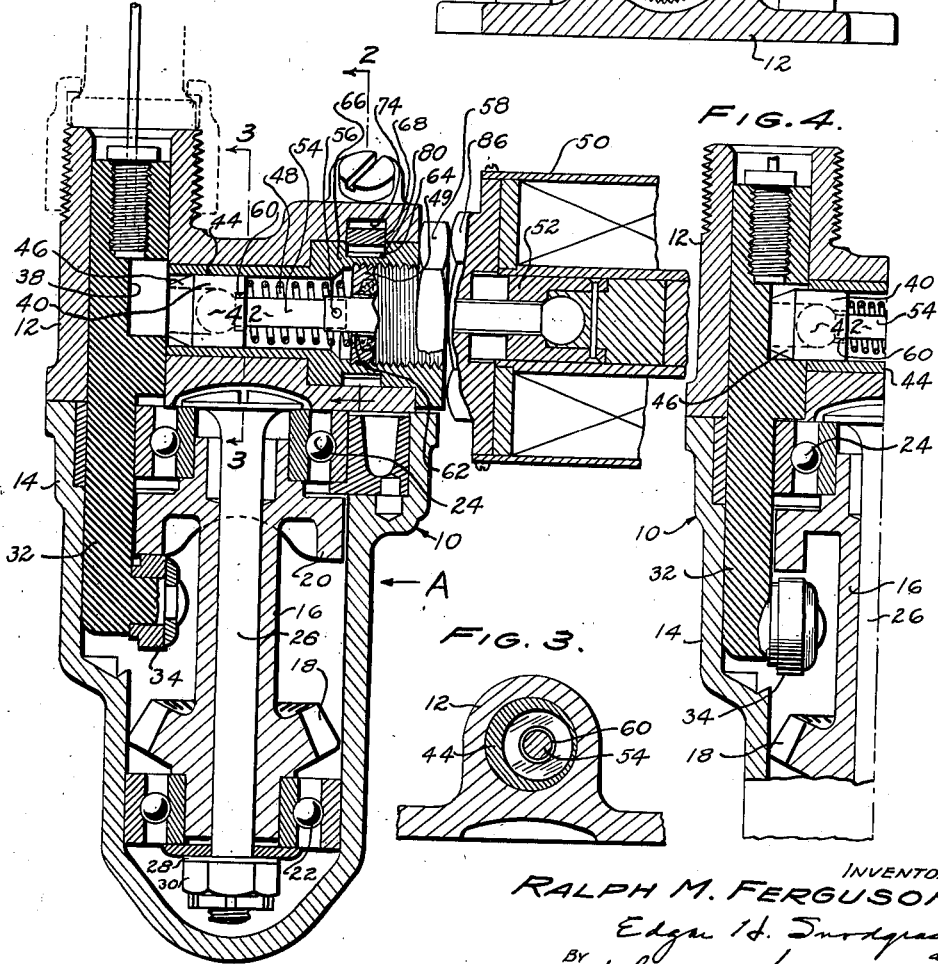
INVENTOR
RALPH M. FERGUSON
BY Edgar H. Snodgrass and Clade Kountz
ATTORNEYS Patented Oct. 29, 1940

2,220,014

UNITED STATES PATENT OFFICE 2,220,014

SYNCHRONIZED CONTROL FOR MACHINE GUNS

Ralph M. Ferguson, Dayton, Ohio

Application April 5, 1939, Serial No. 266,091

12 Claims. (Cl. 89—27)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a synchronized gun control for enabling the gun to be fired between the blades of a rotating propeller.

The object of this invention is to provide an improvement of the type of machine gun control shown and illustrated in United States Letters Patent No. 1,770,125 issued July 8, 1930, to Richard C. Coupland, the improvement being the incorporation with the cam follower locking means of means for varying the position of said locking means relative to its support and in the direction of motion of said cam follower to provide, when engaged with said cam follower, a spacing thereof from the cam in the inoperative or locked position of the control.

The mechanism of a control of this type is normally designed for life commensurate with the intermittent service for which it is designed to be subjected. However, if the cam follower is not spaced out of contact from the cam in the inoperative position of the control, but allowed to make contact at the high point of the cam with each revolution of the engine, the actual life of the control mechanism parts is greatly reduced below their designed life, due to deleterious effects produced in the physical properties of the metals such as crystallization with consequent embrittlement, and also due to the fact that the continuous wear creates "flats" in the cam surfaces and on the roller of the cam follower, this condition being especially prevalent in the case of multi-lobe cams for multi-blade propellers.

It has therefore been found desirable to provide a spacing of the cam follower from the cam in the inoperative position. This spacing is of the order of two or three thousandths of an inch and preferably less, which is a greater precision than can be obtained in assembly due to the cumulative effect of the deviations from dimension resulting from the routine production manufacture of the parts, and therefore is not obtainable in the original assembly. Likewise, wear of the parts subsequent to original assembly must be compensated by further adjustment.

This necessary adjustment of the spacing has heretofore been accomplished by the use of shims between the parts of the impulse generator housing containing the cam and the part of the housing containing the locking means. In this manner, the amount of displacement of the cam follower from the cam on engagement of the locking means with the cam follower, could be varied. This method of adjustment was subject to the disadvantage of requiring disassembly of the impulse generator each time an adjustment was made.

My novel means for accomplishing this adjustment consists in the arrangement with the impulse generator of an eccentric mounting or support for the cam follower locking means, so that, by rotation of the eccentric support, the relative location of the cam follower locking means with respect to the cam is varied, thereby adjusting the spacing of the cam follower from the cam when the locking means engages with the cam follower to actuate the same into the inoperative or disengaged position.

Further objects and advantages of my invention will be readily apparent from the following detailed description and accompanying drawings wherein like reference numerals indicate like parts throughout the several views, and wherein:

Fig. 1 is an assembly view of the trigger motor and impulse generator, with the impulse motor in vertical section and part of the trigger motor broken away and in section;

Fig. 2 is a section view taken on the line 2—2 of Fig. 1;

Fig. 3 is a section view taken on the line 3—3 of Fig. 1; and

Fig. 4 is a partial section view similar to Fig. 1, but with the cam follower contact roller shown in elevation, and with the locking means shown in the locking position, or the inoperative position of the control.

Referring to the drawing, it will be seen that my invention as shown in Fig. 1 comprises an impulse generator A, a trigger motor B and a connecting cable C. The trigger motor and connecting cable are of a construction and function similar to that shown in Figs. 1 and 2 of the above mentioned Patent No. 1,770,125.

The impulse generator is also of a similar general design to that shown by Coupland, comprising a housing 10 of two parts 12 and 14 for enabling assembly. In the lower part of the housing 14 there is disposed a hollow shaft 16 having a beveled gear 18 at one end for driving connection with the crankshaft of the engine and a side-face cam 20 at the other end. Said shaft 16 is rotatably mounted in said housing by means of the ball bearings 22 and 24, the inner races of which are held in fixed assembly with said shaft 16 by means of a bolt 26 extending through said hollow shaft, and by means of the washer 28 and nut 30. A cam follower 32 extending through both parts of the housing is slidably mounted therein, and adapted for engagement with the cam 20 by means of a roller 34 rotatably secured to one end of said follower. Said cam follower is detachably connected at its other end to the trigger motor B by means of the cable C, and during operation, is yieldingly urged against the cam 20 by means of a spring 36 in the trigger motor. The cam follower is provided intermediate of the ends with a notch 38 suitably located and adapted to receive the head 40 of a release plunger assembly 42 or locking means which is arranged in the housing so as to register with said notch.

The head 40 of the release plunger 42 is slidably mounted in a sleeve 44 more fully described hereinafter and is provided with a bevel 46 at its forward end to facilitate engagement with the notch 38. The plunger is urged toward the notch at all times by a spring 48 bearing against the rear surface of the plunger head 40 and against a member 49 in fixed relation with the sleeve 44 and will normally assume the position shown in Fig. 4, thereby locking the cam follower in a position disengaged from the cam. Release of the trigger motor for operation is obtained by suitable power means, and as illustrated, by a solenoid 50 detachably connected to the sleeve 44 by a threaded connecting member 49 and having its movable core 52 positively connected to the release plunger by a limited universal connection comprising a link rod 54 attached at one end by a ball and socket connection in the plunger head 40, and at the other end by a ball and socket in the movable core 52 of the solenoid. The link rod 54 is shown formed of two parts connected by a pin 56 to facilitate assembly.

To provide the adjustment of the spacing by which the plunger 42 disengages the cam follower 32 from the cam 20, the support or sleeve 44 in which the plunger is mounted is in the form of a bushing rotatably disposed in the housing section 12 and having an inner cylindrical surface eccentric with respect to the outer surface (see Fig. 3). Rotation of the eccentric mounting or sleeve 44 is readily accomplished by means of the nut 58 made integral therewith and arranged exteriorly of the housing. It is thereby seen that by rotation of the nut 58 the eccentric sleeve varies the relative location of the plunger 42 with respect to the cam 20 and in the direction of motion of the cam follower. In this manner minute adjustment of the spacing of the cam follower 32 from the cam 20 can be obtained. The position of the cam and cam follower when disengaged by the release plunger is shown in Fig. 4, but the showing of the extent of adjustment between the cam and cam follower is greatly exaggerated in the drawings for the purpose of illustration.

To provide for the relative shift between the positions of the plunger head and the solenoid upon rotation of the eccentric mounting 44, the link rod 54 is spaced from the inner diameter 60 of the plunger head and from the inner diameter 62 of the external solenoid connection 49 in order to enable angular displacement on rotation of the sleeve 44.

Locking of the eccentric member 44 is partially provided by means of a serrated peripheral portion 64 which, as shown, is recessed in an enlarged outer end 66 of the sleeve, and a locking element 68 with corresponding serrations 70, supported and held in engagement with the serrated portion of the sleeve by means of the set screw 72 (see Fig. 2). To aid in the alignment of the locking element with the serrated portion of the sleeve, it is formed with ends extending beyond the serrations thereby giving it a substantially crescent shape. A recess 74 is formed in the housing section 12 to accommodate the locking element 68 during assembly or disassembly. The locking element is centralized and aligned with the serrated portion by engagement of a central bore 76 therein by a pilot 78 attached to the end of the set screw 72. In order to prevent the locking element 68 sticking to the serrated portion 64 of the eccentric member and thus preventing disassembly, the locking element 68 has the transverse bore 76 which the set screw pilot 78 engages, threaded in order that a screw bolt with matched threads may be inserted to withdraw it into the recess 74 provided, and out of the path of the side walls 80 of the recessed serrated portion of the eccentric. It is thereby seen that the locking element 68 also serves to restrain the sleeve 44 against longitudinal displacement, being constructed of such dimensions that it bears against the side walls 80 of the serrated portion 64 of the sleeve and against the side walls of the recess 74 in the housing, functioning in the manner of a key and slot.

An index or reference means for determining the amount of rotation being imparted to the sleeve 44 can be obtained by adjusting the locking element 68 until the teeth are just in contact with the teeth of the serrated portion 64 of the sleeve. Thus, each fraction of revolution of the sleeve as measured by the signal or click of the registering serrations can be detected and determined. In this way, the operator can measure the desired amount of adjustment by the feel of the number of serrations or teeth displaced.

To provide for an adjustable friction fit for the eccentric sleeve and a further locking of the sleeve 44, a portion of the housing recess in which it is mounted is split as shown at 82. The desired fit between the housing and sleeve during adjustment of the sleeve, as well as a further locking or clamping action of the sleeve in the desired position of eccentricity, is obtainable by tightening or loosening of the bolt and nut 84.

The operation of my improved synchronizing control is briefly as follows: The cam 20 is continuously rotating at engine or crankshaft speed by virtue of the driving connection with the bevel gear 18. The cam follower 32 is normally disengaged from the cam by the engagement of the plunger head 40 with the notch 38 in the cam follower in response to the actuation of the spring 48 against the plunger head 40. On closing of the solenoid circuit by a suitable switch button (not shown) the solenoid becomes energized causing the movable core 52 to withdraw the plunger head 40 from the notch 38 in opposition to the action of the spring 48. The spring 36 in the trigger motor B then urges the cam follower contact roller 34 into contact with the cam face 20 and each lobe of the rotating cam imparts an impulse or reciprocating motion to the mechanism of the trigger motor B with each revolution of the cam. The reciprocating motion of the trigger motor mechanism is fully described by Coupland in his hereinbefore mentioned patent and causes the machine gun to be fired in the well-known manner.

Adjustment of the extent of spacing by which the cam follower is disengaged from the cam in the inoperative or locked position of the control is made by loosening the split clamp 82, withdrawing the sleeve locking element 68 until the serrations are lightly contacting with those on the sleeve, and then rotating the sleeve 44 the desired amount, using the clicks of the serrations as an index means to signal the amount of adjustment. The adjustment is preferably made by removing the solenoid and regularly equipped plunger by unscrewing the nut 86 and substituting for the regular plunger, a plug of corresponding diameter which does not have the bevel on the head as provided for the regular plunger head. The cam is then turned until the cam follower is on the lobe of the cam. This position can be easily ascertained by observing the position of the elements in the trigger motor. The sleeve is then rotated until the plug will just engage the notch. A few extra degrees of revolution are then given to the sleeve to cause said plug to further actuate said cam follower in its direction of motion away from the cam, thereby providing the desired spacing. The freedom from contact between the cam and cam follower can then be ascertained by rotating the cam and observing the sound and the feel of the apparatus. The split clamp 82 is then tightened and the sleeve locking element 68 urged tightly in contact with the serrated portion of the sleeve, thereby holding the sleeve 44 in the adjusted position. The plug is now removed and the regular plunger 42 inserted and the solenoid attached.

Although the extent of spacing was hereinbefore mentioned as being in the order of two or three thousandths of an inch or less, it is possible to obtain an adjustment of five ten thousandths of an inch as the teeth or serrations of the portion 64 are regularly made of such dimension in the usual installation that the rotation of the sleeve 44 by one tooth or serration is the equivalent of five ten thousandths of an inch spacing of the cam follower from the cam. It is advantageous to make the adjustment as small as possible as in that way less work is required of the plunger 42 as it engages the notch 38 of the cam follower and actuates the cam follower out of engagement from the cam 20 by virtue of the camming effect of the bevel 46, and likewise, less work is required of the solenoid in releasing the cam follower.

It is to be understood that my invention is not limited to the precise details of construction and arrangement illustrated and described, but that such changes and modifications are included as do not involve a departure from the spirit of the invention and the scope of the appended claims.

I claim:

1. In a synchronizing gear for machine guns, an impulse generator including a housing, an engine-driven cam rotatably mounted in said housing, a cam follower disposed in said housing and yieldingly urged against said cam, and means mounted in said housing and movable relative to said cam follower in the direction of motion of said cam follower for releasably locking the same in a position out of contact with said cam, said means including eccentric means for effecting said relative adjustment.

2. In a synchronizing gear for machine guns, an impulse generator including a housing, an engine-driven cam rotatably mounted in said housing, a cam follower disposed in said housing and yieldingly urged against said cam, means mounted in said housing for releasably locking said cam follower in a position out of contact with said cam and an adjustable eccentric element movable about an axis normal to the direction of motion of said cam follower for predeterminedly establishing said position.

3. In a synchronizing gear for machine guns, an impulse generator including a housing, an engine-driven cam rotatably mounted in said housing, a cam follower disposed in said housing and yieldingly urged against said cam, means mounted in said housing for releasably locking said cam follower in a position out of contact with said cam and an eccentric element, rotatable for adjusting said locking means to vary the extent of disengagement of said cam follower from said cam.

4. In a synchronizing gear for machine guns, an impulse generator including a housing, an engine-driven cam rotatably mounted in said housing, a cam follower disposed in said housing and yieldingly urged against said cam, means supported in said housing for locking the cam follower in an inoperative position, means for effecting an adjustment of said locking means relative to its support and in the direction of motion of said cam follower to enable disengagement of said cam follower from said cam in the inoperative position of said cam follower, and means for actuating said locking means into operative and inoperative positions.

5. In a synchronizing gear for machine guns, an impulse generator including a housing, an engine-driven cam rotatably mounted in said housing, a cam follower disposed in said housing and yieldingly urged against said cam, an eccentric sleeve rotatably mounted in said housing, a plunger slidably mounted in said sleeve and adapted to cooperate with said cam follower to disengage same from said cam, said sleeve being adjustable to vary the extent of disengagement of said cam follower from said cam, means for locking said eccentric sleeve against further rotation in any adjusted position thereof and means flexibly connected to said plunger for disengaging said plunger from said cam follower in any adjusted position of said rotatable sleeve.

6. In a synchronizing gear for machine guns, an impulse generator including a housing, an engine-driven cam rotatably mounted in said housing, a cam follower disposed in said housing and yieldingly urged against said cam, a cam follower locking means disposed in said housing comprising a supporting element and a plunger element, one of said elements being in the form of an eccentric sleeve rotatably mounted in said housing for varying the relative positions between the plunger element and the cam follower in the direction of motion of the cam follower, said plunger element being adapted to normally engage with said cam follower to hold it in an inoperative position and means for disengaging said plunger element from said cam follower.

7. In a synchronizing gear for machine guns, an impulse generator including a housing, an engine-driven cam rotatably mounted in said housing, a cam follower disposed in said housing and yieldingly urged against said cam, a releasable locking means for said cam follower disposed in said housing, comprising a supporting element and a plunger element, one of said elements being in the form of an eccentric sleeve rotatably mounted in said housing for varying the relative positions between the plunger element and the cam follower in the direction of motion of the cam follower, said plunger element being adapted to normally engage with said cam follower to hold it in an inoperative position, a portion of the housing in which said sleeve is mounted being in the form of a split clamp and means for releasably clamping said sleeve in any adjusted position thereof.

8. In a synchronizing gear for machine guns, an impulse generator including a housing, an engine-driven cam rotatably mounted in said housing, a cam follower disposed in said housing and yieldingly urged against said cam, a locking means arranged in said housing and engageable with said cam follower to hold it in an inoperative position, an eccentric member mounted in the housing for supporting said locking means and rotatable to vary the position of said locking means relative to said cam in the direction of motion of said cam follower, means for disengaging said locking means from said cam follower and index means associated with said rotatable eccentric mounting to enable small adjustments thereof.

9. In a synchronizing gear for machine guns, an impulse generator including a housing, an engine-driven cam rotatably mounted in said housing, a cam follower disposed in said housing and yieldingly urged against said cam, a cam follower locking means disposed in said housing comprising a supporting element and a plunger element, one of said elements being in the form of an eccentric sleeve rotatably mounted in said housing for varying the relative positions between the plunger element and the cam follower in the direction of motion of the cam follower, means for adjusting said sleeve in fixed relation to its support, said plunger element being adapted to normally engage with said cam follower to hold it in an inoperative position, and means flexibly connected to said plunger for disengaging said plunger from said cam follower in any adjusted position of said rotatable sleeve.

10. In a synchronizing gear for machine guns an impulse generator, including a housing, an engine-driven cam rotatably mounted in said housing, a cam follower disposed in said housing, yieldably urged against said cam and having a notch therein, a bore in said housing, the open end portion thereof being in the form of a split clamp, an eccentric sleeve rotatably mounted in said bore, a plunger slidably mounted in said sleeve and normally engaging said cam follower notch to hold said cam follower in an inoperative position, said eccentric sleeve being adjustable to vary the relative position between said plunger and said cam follower in the direction of motion of said cam follower, the outer surface of said sleeve having a bearing portion and a serrated portion, a recess in said housing bore opposite said serrated portion, a releasable locking element disposed in said recess having serrations thereon complemental to the serrations on said eccentric sleeve for locking said sleeve against rotation in any adjusted position and means flexibly connected to said plunger for disengaging said plunger from said cam follower in any adjusted position of said rotatable sleeve.

11. An impulse generator for use in connection with a synchronizing gear for machine guns comprising, a housing, an engine driven cam rotatably mounted in said housing, a cam follower disposed in said housing, means for yieldingly urging said cam follower against said cam, means for releasably locking said cam follower in a position out of contact with said cam and means for adjustably moving said locking means in the direction of motion of said cam follower for varying the space relation between said cam and follower in the locked position of said follower.

12. An impulse generator for use in connection with a synchronizing gear for machine guns comprising, a housing, an engine driven cam rotatably mounted in said housing, a cam follower disposed in said housing, means for yieldingly urging said cam follower against said cam, power actuated means for releasably locking said cam follower in a position out of contact with said cam and means for adjustably moving said locking means in the direction of motion of said cam follower for varying the space relation between said cam and follower in the locked position of said follower.

RALPH M. FERGUSON.